Jan. 6, 1948.        E. J. SCHAAF ET AL        2,434,124
CORN HARVESTER
Filed Sept. 22, 1944
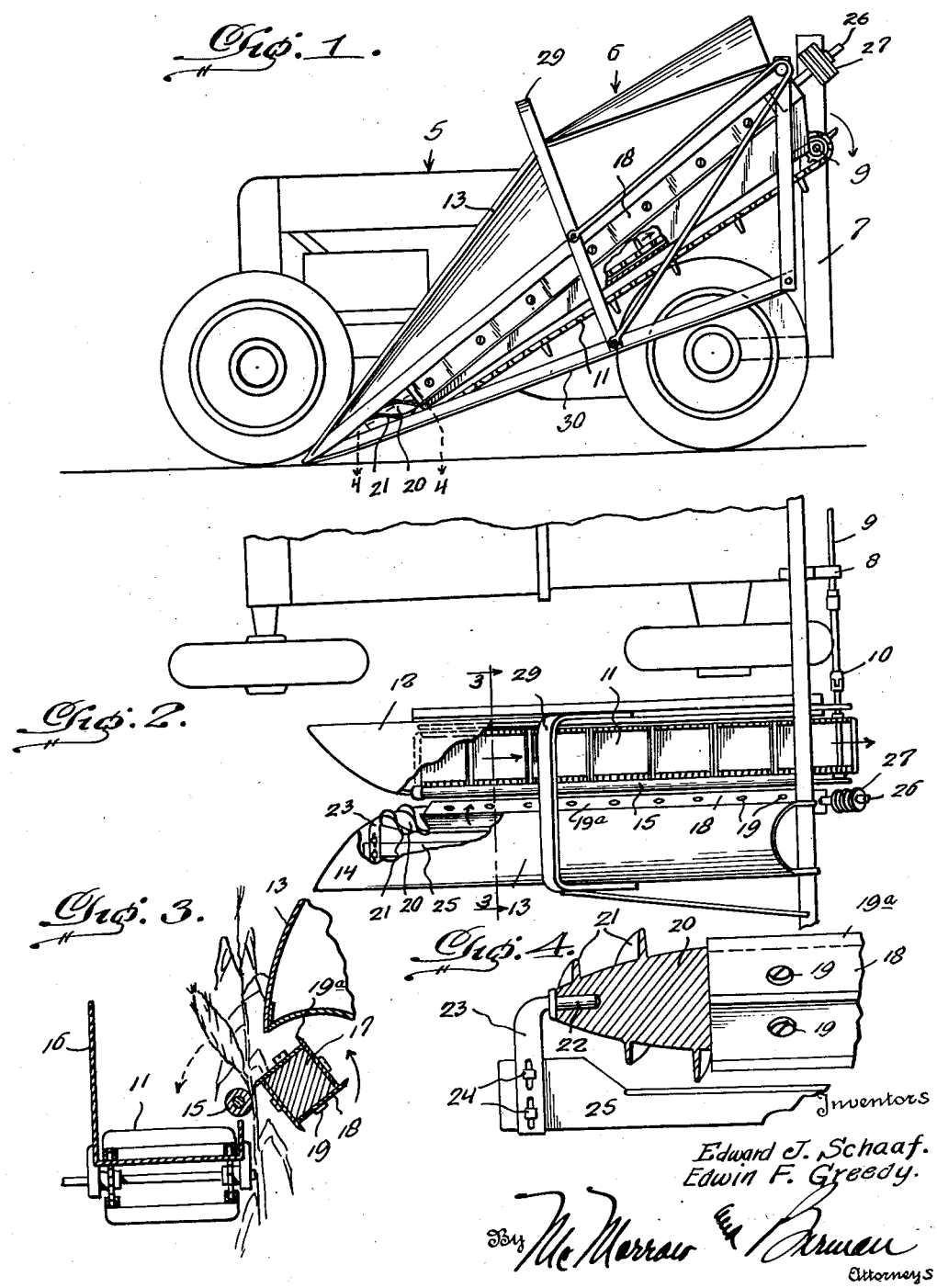

Patented Jan. 6, 1948

2,434,124

UNITED STATES PATENT OFFICE 2,434,124

CORN HARVESTER

Edward J. Schaaf and Edwin F. Greedy, Anderson, Iowa, assignors to The Midwest Co., Nebraska City, Nebr., a corporation Application September 22, 1944, Serial No. 555,316

9 Claims. (Cl. 56—103)

This invention appertains to new and useful improvements in harvesters and more particularly to a machine in the form of an attachment for tractors especially adapted for harvesting sweet corn.

The principal object of the present invention is to provide a harvester adapted to snap off the ears of corn from standing corn stalks in a much more efficient and fool-proof manner than is now possible with present-day harvesters.

Another important object of the invention is to provide a harvester of the character stated wherein means is provided whereby the corn stalks are fed back until the height at which the ears are located is reached and at which point the cutter severs the ears and to the end that they fall upon an adjacent elevator.

A further object of the invention is to provide a harvester of the character stated which in operation will reduce the loss of corn ears to a minimum.

Other objects and advantages of the invention shall become apparent to the reader of the following description.

In the drawings:

Figure 1 is a side elevational view of the attachment.

Figure 2 is a top plan view with portions broken away.

Figure 3 is a transverse sectional view taken substantially on a line 3—3 of Figure 2.

Figure 4 is a fragmentary horizontal sectional view taken substantially on the line 4—4 of Figure 1 with the hood removed.

Referring to the drawings wherein like numerals designate like parts; it can be seen that numeral 5 generally refers to a tractor. The machine of present invention is generally referred to by numeral 6 and includes a frame 7 upon which the mechanism is mounted and by which it is secured to the tractor 5. The frame 7 is provided with bearings 8 for a drive shaft 9 which is interrupted by a universal joint 10. The shaft 9 drives the upper end of an inclined elevator 11, the lower end of which passes into a shell or gathering point 12.

A longitudinally extending hood or guard 13 is disposed laterally and in parallel relation with respect to the elevator 11 and has a gathering point 14 at its lower end.

Over the edge of the elevator 11 adjacent the hood 13 is a roll 15 and it is preferable that the opposite side of the elevator 11 be provided with an upstanding wall 16 to prevent the ears of corn from falling off that side of the elevator.

An elongated rotor 17 of square cross section has blades 18 secured by screws or the like 19 to the four sides thereof and in such a manner that the cutting edges 19a thereof project beyond adjacent sides of the rotor. The lower end of the rotor 17 has a bullet-head-shaped nose 20 on which is a spiral fin 21. The small end of the nose 20 is recessed and into this is disposed a pin 22 carried by a bracket 23, this pin serving as bearing upon which the lower end of the rotor is supported. Adjustable means 24 is provided between the bracket 23 and a supporting bar 25.

The cutting edges 19a of the rotor 17 just barely miss the roll 15 in their cutting action against the corn.

The upper end of the rotor 17 has a shaft extension 26 having pulleys 27 thereon over which drive belts (not shown) are trained for driving the rotor in the direction as shown by the arrow in Figure 3 from the tractor by means of a suitable power take-off.

A bridge frame 29 is disposed over the elevator 11 and hood 13 to secure these structures to a sub-frame 30 and in proper spaced relation with to each other.

In the operation of this attachment, it can be seen that the attachment is directed along a row of corn and the stalks are gathered by the gathering points 12, 14 and into the attachment between the roll 15 and the rotor 17. As the ears of corn come to a point between the roll 15 and a cutting edge 19a of the rotor 17, the cutting edge severs each ear off by its shank and the same falls over onto the elevator 11 where it is elevated and delivered from the machine as shown by the arrow in Figure 2 for further handling.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

1. A corn harvesting machine for cutting ears of corn from stalks in the field comprising: a mobile vehicle frame; a stalk engaging guide mounted on said frame and extending longitudinally thereof in the direction of its travel; and a driven rotor journalled in the frame in substantially parallel spaced relation to said guide so as to provide an open front passageway to admit standing corn between the guide and rotor, said rotor having a cutting blade provided with a chamfered cutting edge extending outwardly a substantial distance from the rotor sufficient to cut through a corn stalk and traveling downwardly towards said guide, the guide being substantially coextensive with said cutting edge, and said rotor having a portion of its cutting edge spaced from said guide a distance less than the diameter of a stalk of corn whereby the guide and rotor cooperate to cut ears of corn from stalks passing therebetween.

2. A machine as specified in claim 1, in which a guird is mounted on the frame above the rotor so as to prevent severed ears from falling onto the blade, and a driven conveyor is mounted on said frame to receive said severed ears.

3. A machine as specified in claim 1, in which the front portion of the rotor is laterally adjustable to regulate the width of the space between the guide and cutting blade.

4. A machine as specified in claim 1, in which the rotor has a plurality of cutting blades, and each of the blades has its cutting edge extending outwardly and forwardly in the direction of rotation.

5. A machine as specified in claim 1, in which the rotor has a square shaft to which a plurality of cutting blades are detachably secured, and the chamfered cutting edge of each blade is formed by a bevel on the outer face of said blade.

6. A corn harvesting machine for severing ears of corn from stalks in the field comprising: a mobile vehicle frame; a stalk engaging guide mounted on said frame and extending longitudinally thereof in the direction of its travel; and a longitudinally extending driven rotor journalled in the frame alongside of said guide so as to provide an open front passageway to admit standing corn between the guide and rotor, said rotor having a plurality of cutting blades, each of said blades having a forwardly extending cutting portion to travel downwardly towards said guide and cut into a corn stalk, said cutting portion extending farther from the axis of the rotor than the body of the blade to provide space between said body and guide into which the adjacent uncut portion of the stalk may be drawn, the guide being opposite from said cutting portion and spaced therefrom a distance less than the diameter of a stalk of corn whereby the guide and blade cooperate to feed the stalks downwardly and to sever ears of corn therefrom.

7. A corn harvesting machine as specified in claim 6 in which the stalk engaging guide is in the form of a roll which is journalled in the frame.

8. A machine as specified in claim 6, in which the rotor has four flat cutting blades detachably mounted in overlapping relationship so as to describe a square about the axis of said rotor.

9. A machine as specified in claim 6, in which a guard is mounted on the vehicle frame above the rotor so as to prevent severed ears from falling onto the blades, and a driven conveyor is mounted on said frame to receive said severed ears.

EDWARD J. SCHAAF.
EDWIN F. GREEDY.

REFERENCES CITED

The following references are of record in the file of this patent:

UNITED STATES PATENTS

| Number | Name | Date |
|---|---|---|
| 196,400 | Terman | Oct. 23, 1877 |
| 461,246 | Meader | Oct. 13, 1891 |
| 880,139 | Hahn | Feb. 25, 1908 |
| 923,806 | Boda | June 8, 1909 |

Disclaimer 2,434,124.—*Edward J. Schaaf* and *Edwin F. Greedy*, Anderson, Iowa. CORN HARVESTER. Patent dated Jan. 6, 1948. Disclaimer filed Sept. 28, 1951, by the assignee, *The Midwest Co.*

Hereby enters this disclaimer to the specification, and particularly to claims 6, 7, and 9, of any construction in which the cutting blades during their operation contact the opposed guide, or any construction in which the longitudinal cutting edges of said blades do not extend close to the front of the open passageway.

[*Official Gazette November 6, 1951.*]